United States Patent
Dahlgren et al.

(10) Patent No.: US 8,154,369 B2
(45) Date of Patent: Apr. 10, 2012

(54) METHOD AND DEVICE FOR CONTROLLING OF A MAGNETIC FLUX

(75) Inventors: Mikael Dahlgren, Västerås (SE); Stefan George Thorburn, Västerås (SE); Gunnar Russberg, Västerås (SE)

(73) Assignee: ABB Research Ltd., Zurich (CH)

( * ) Notice: Subject to any disclaimer, the term of this patent is extended or adjusted under 35 U.S.C. 154(b) by 151 days.

(21) Appl. No.: 11/992,832

(22) PCT Filed: Sep. 27, 2006

(86) PCT No.: PCT/SE2006/050354
§ 371 (c)(1),
(2), (4) Date: Sep. 13, 2010

(87) PCT Pub. No.: WO2007/073316
PCT Pub. Date: Jun. 28, 2007

(65) Prior Publication Data
US 2011/0001592 A1    Jan. 6, 2011

(51) Int. Cl.
H01F 30/14    (2006.01)
H01F 21/02    (2006.01)
(52) U.S. Cl. .................. 335/217; 336/5; 336/10; 336/30
(58) Field of Classification Search .................. 335/146, 335/208, 217; 336/5, 10, 30
See application file for complete search history.

(56) References Cited

U.S. PATENT DOCUMENTS

| 3,454,914 A | 7/1969 | Merkl |
| 3,743,866 A * | 7/1973 | Pirc ............................. 310/306 |
| 6,467,326 B1 * | 10/2002 | Garrigus ......................... 72/430 |

FOREIGN PATENT DOCUMENTS
EP    1211699 A2    6/2002

OTHER PUBLICATIONS

PCT/ISA/210—International Search Report—Jan. 24, 2007.
PCT/ISA/237—Written Opinion of the International Search Authority—Jan. 24, 2007.

* cited by examiner

Primary Examiner — Ramon Barrera
(74) Attorney, Agent, or Firm — Venable LLP; Eric J. Franklin

(57) ABSTRACT

A device for controlling a magnetic flux in an electromagnetic system, wherein the system includes magnetically connected magnetic cores, between which a volume is arranged. The volume includes a controllable magnetic flux region and the magnetic flux region includes a magnetic material having a relative permeability that may be varied by influencing the temperature of the material. The magnetic material includes a magnetic material, the Curie point of which lies within the temperature operating range of the device and exhibits paramagnetic properties within the temperature range. Also a method of controlling a magnetic flux.

17 Claims, 2 Drawing Sheets

METHOD AND DEVICE FOR CONTROLLING OF A MAGNETIC FLUX

CROSS-REFERENCE TO RELATED APPLICATIONS

This application claims priority to Swedish patent applications 0502169-6, 0502716-4, and 0502715-6 filed 29 Sep. 2005 and is the national phase under 35 U.S.C. §371 of PCT/SE2006/050354.

FIELD OF INVENTION

The present invention relates to a device for controlling a magnetic flux in an electromagnetic system comprising magnetically connected magnetic cores.

The invention also relates to a method of controlling a magnetic flux in an electromagnetic system comprising magnetically connected magnetic cores.

DESCRIPTION OF THE BACKGROUND ART

Magnetic flux control in electromagnetic applications may be used to vary linking paths between windings in an electrical apparatus, e.g. a transformer, and thereby achieve needed changes in some aspect of its functionality, e.g. a voltage or an impedance change.

Cross field magnetic saturation may be used to limit the total effective flux or to commute flux paths going through or passing a winding in an electromagnetic machine but such method is not well suited for continuous control.

For continuous redistribution of magnetic flux between windings limited angular displacement of the rotor of a rotating machine can be used.

The present invention seeks to provide an improved device for controlling a magnetic flux and a method of controlling a magnetic flux.

SUMMARY OF THE INVENTION

According to a first aspect of the invention there is provided a device where a volume is arranged between the cores, wherein the volume comprises a controllable magnetic flux region, and that the magnetic flux region contains a magnetic material that exhibits a relative permeability that may be varied by influencing the temperature of the material.

By utilizing the fact that a thermomagnetic material may be switched between being magnetically conductive and magnetically non-conductive by changing its temperature and by controlling the temperature distribution in a volume filled with properly chosen thermomagnetic material, a continuously controllable magnetic flux path pattern, linking e.g. two stators, is obtained.

According to a preferred embodiment, the system is a polyphase system comprising magnetic cores with opposed poles, which opposed poles are fixedly arranged in relation to each other, and that the volume is arranged between opposed poles, said volume comprising a controllable magnetic flux region.

In this way the same effect as a mechanical relative displacement of the stators is achieved without the need for large moving parts.

According to a preferred embodiment, the volume is divided into a matrix and comprises means for controlling the temperature of each matrix element for control of the magnetic flux through the volume with respect to magnitude and/or direction.

By dividing the volume into a matrix it is possible to control the temperature distribution by heating/cooling of the active material, preferable by channels through the active material with the thermal fluid fluxes controlled by suitable valves.

According to a preferred embodiment, the magnetic material consists of a material, the Curie point of which lies within the temperature operating range of the device and exhibits paramagnetic properties within said temperature range. Hereby available sources of heating and cooling medium can be used.

According to a preferred embodiment, the magnetic flux region contains Gd (gadolinium), which exhibits the property that the relative permeability is greatly temperature-dependent.

It has been proved that the element gadolinium (Gd) is a material that is especially suited in the magnetic region according to a preferred embodiment. This is based on the realization that gadolinium, which is a ferromagnetic material, has the unique property that its Curie temperature is low, actually 292° K, which corresponds to 19° C. The Curie temperature is the limit above which a ferromagnetic material exhibits normal paramagnetic performance. This implies that the permeability of gadolinium is changed when its temperature varies around the Curie temperature. It is realized that for gadolinium, therefore, the permeability may be controlled if the temperature varies around room temperature and above. A special property of gadolinium is the considerable change in permeability that occurs also with small temperature variations in the interval above the Curie point. For example, the relative permeability may be changed in the order of magnitude of from 1000 to 1 by a change in temperature from 20° C. to 40° C.

According to a preferred embodiment, the magnetic flux region containing Gd (gadolinium) is doped with a substance that influences the symmetry of the crystal lattice and/or doped with a substance that influences the temperature of its magnetic phase transition. The magnetic coupling intrinsically in the material is influenced.

Hereby the magnetic flux region of the device is optimised for the control at a preferred temperature interval.

According to a preferred embodiment, the dopant is one or more of the substances belonging to the group of rare-earth elements, such as La, Ce, Pr, Nd, Pm, Sm, Eu, Tb, Dy, Ho, Er, Tm, Yb, Lu.

According to a preferred embodiment, the means for temperature control are adapted to vary the temperature of the matrix elements between 20° C. and 150° C., preferably between 30° C. and 70° C.

This temperature range is in line with industrial commonly available heat and cooling sources, which is economically an technical advantageous.

According to a preferred embodiment, the respective pole in the cores is provided with pole windings, which gives improved regulating possibilities.

According to a second aspect of the invention there is provided a method wherein the magnetic flux is controlled by varying the temperature of a magnetic material in a magnetic flux region of a volume arranged between the cores, which magnetic material exhibits a relative permeability that is highly temperature dependent.

According to a preferred method, the temperature of the magnetic material is varied 20° C. and 150° C., preferably between 30° C. and 70° C.

According to a preferred method, the control takes place without any relative mechanical movement between the magnetically coupled cores.

The control of the magnetic flux in the volume takes thus place by a change of temperature of one or more magnetic regions in the volume, which respective region contains a material that provides a considerable change of the relative permeability in relation to the temperature change.

BRIEF DESCRIPTION OF THE DRAWINGS

An embodiment of the present invention is described below, by way of example only, in greater detail with reference to the accompanying drawings, where FIG. 1 schematically shows opposed cores with pole rows in a device according to an embodiment of the invention.

DETAILED DESCRIPTION OF PREFERRED EMBODIMENTS

Figure 1:
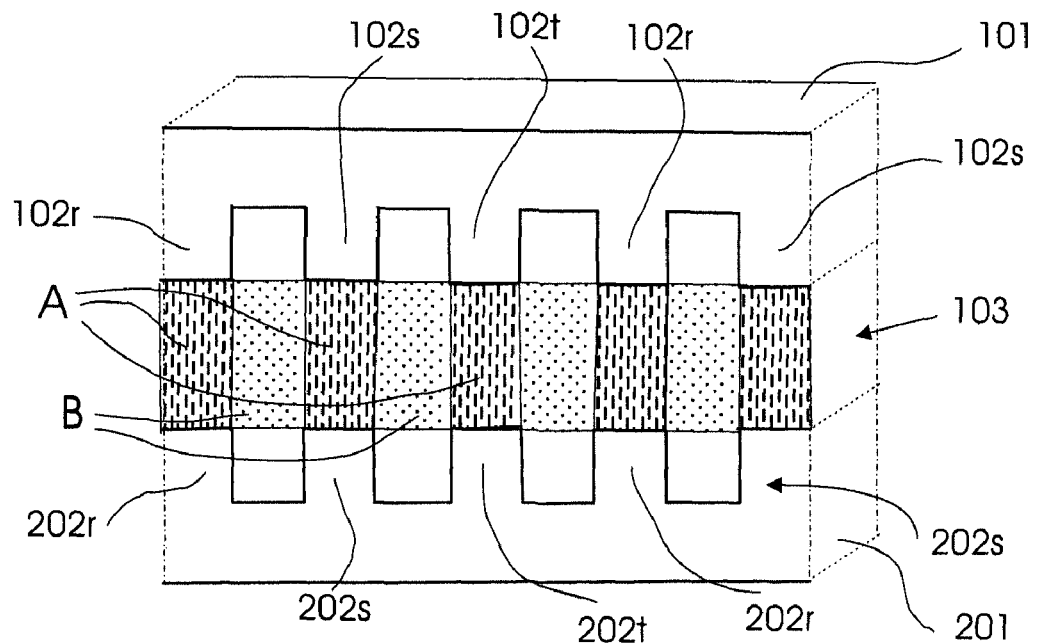

In FIG. 1, 101 and 201 are magnetic cores in a magnetic three-phase system with opposed pole rows 102r, 102s, 102t and 202r, 202s, 202t, respectively. The figure only shows one section of the pole rows. Pole windings (not shown) are arranged around the respective pole.

The opposed pole rows are fixed in relation to each other and a volume 103 is arranged between the opposed pole rows. The volume 103 comprises a controllable magnetic flux region.

Figure 3:
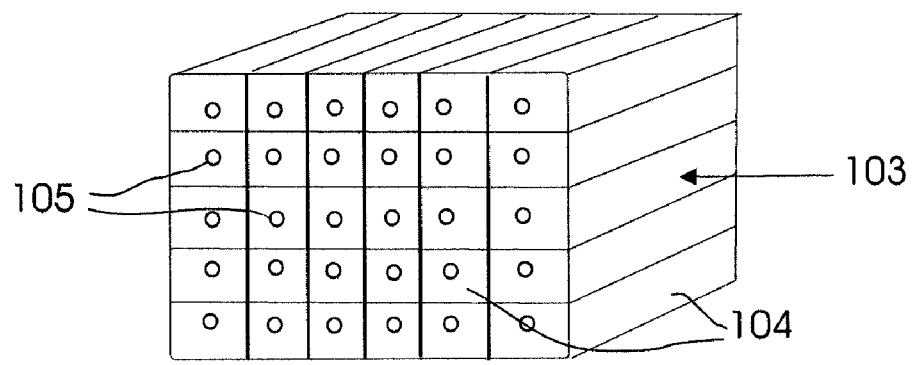
FIG. 3 shows a volume according to an embodiment of the invention, divided into a matrix with matrix elements.

FIG. 3 shows how the volume 103 is shaped as a matrix consisting of matrix elements 104. Each matrix element consists of a magnetic material and its temperature is individually controllable by channels 105, arranged in the element, for a heat-exchanging medium. By controlling the temperature of the matrix elements 104, the magnetic flux is influenced by the volume in magnitude and/or direction.

This is achieved in that, the magnetic material in the matrix elements consists of a material, the Curie point of which lies within the temperature operating range of the device and exhibits paramagnetic properties within said temperature range.

By individual control of the relative permeability within the matrix element of the volume, a displacement of the magnetic flux may be achieved in relation to the centre line of opposed poles. The control region achieved is illustrated in FIGS. 1 and 2.

In FIG. 1, a low temperature is imparted to the matrix elements marked A in the volume, which results in a high relative permeability of the material in this region, the volume in this region thus becoming magnetically conductive. The magnetic flux between the pole rows 102r, 102s and 102t and the opposed pole rows 202r, 202s and 202t is thus concentrated at these regions, which in FIG. 1 is illustrated by means of close flux lines.

On the other hand, a high temperature is imparted to the matrix elements marked B in the volume, which results in a low relative permeability of the material in this region, the volume in this region thus not becoming magnetically conductive. The magnetic flux in this region thus becomes very low, which in FIG. 1 is illustrated by means of sparse flux lines.

Figure 2:
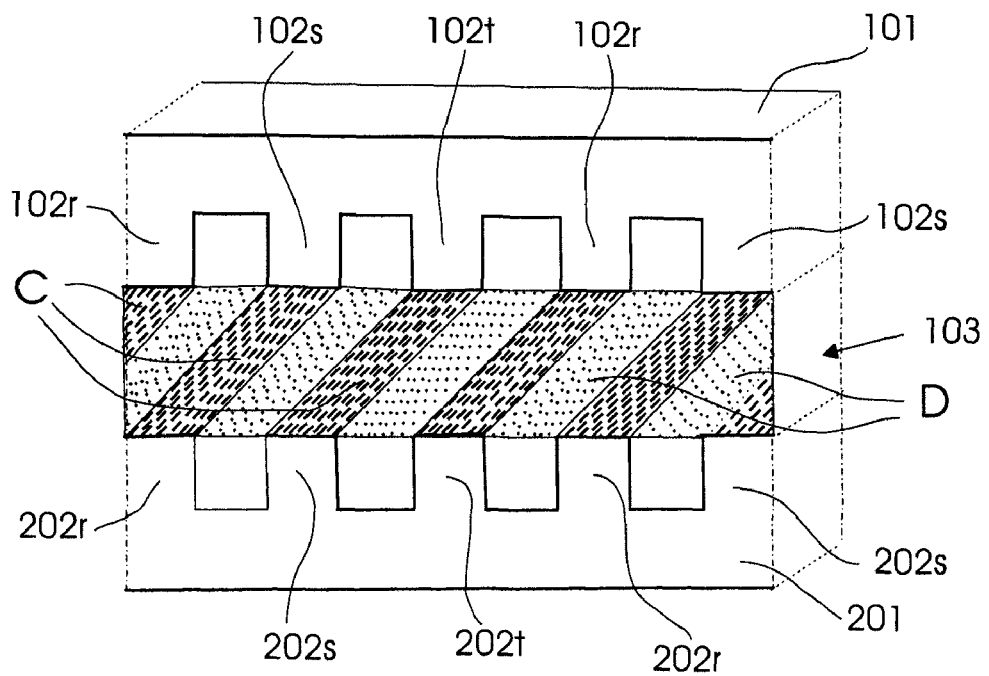
FIG. 2 shows a schematic device according to FIG. 1 but in a different control position.

In FIG. 2, a low temperature is imparted to the matrix elements marked C in the volume, which results in the volume in this region becoming magnetically conductive.

A high temperature is imparted to the matrix elements marked D in the volume, which results in the volume in this region becoming poorly or non-magnetically conductive. The magnetic flux is thus controlled between the pole rows 102r, 102s and 102t instead of to the opposite poles 202s, 202t and 202r.

It is thus realized that a phase shift is accomplished in the electrical system.

Similarly, it is possible, for example, to impart a high temperature to all the matrix elements in the volume, the magnetic flux between opposed poles thus becoming very low or terminating. Likewise, it is also possible to impart a low temperature to all the segments in the volume.

FIGS. 1 and 2 show two positions as regards the phase-shifting function that may be accomplished, but it is realized that embodiments of the invention makes it possible to arbitrarily and individually control the temperature of the respective matrix segments, hence achieving the desired conduction of the magnetic flux between the two cores with their poles, and this without any mutual mechanical displacement of the pole rows.

Figure 4:
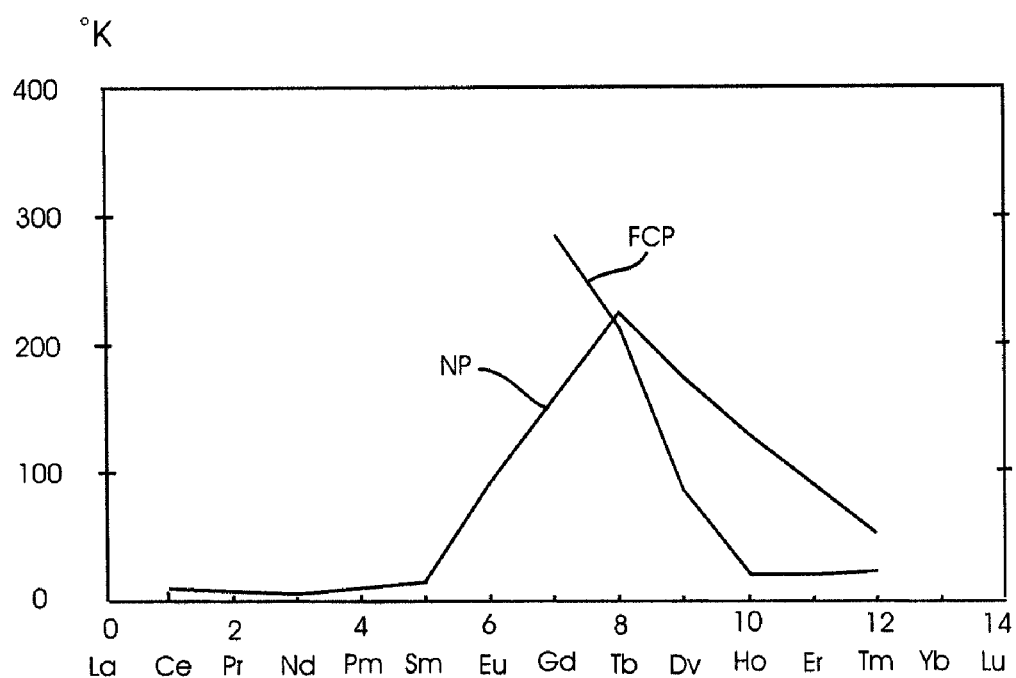
FIG. 4 shows in the form of a diagram the ferromagnetic Curie point and the Neel point, respectively, of a few rare-earth metals versus the absolute temperature.

FIG. 4 shows in the form of a diagram the magnetic Curie temperature of a few rare-earth metals. The absolute temperature (° K) is shown on the Y-axis, and the X-axis shows elements belonging to rare-earth metals indicated according to the number 4f of electrons. These elements are La, Ce, Pr, Nd, Pm, Sm, Eu, Gd, Tb, Dy, Ho, Er, Tm, Yb and Lu. The curve designated NP shows the Neel temperature and the curve designated FCP shows the ferromagnetic Curie temperature of these materials. The diagram shows, inter alia, that gadolinium is the substance that has the highest Curie temperature of these substances, that is, around room temperature.

Embodiment of the invention has been described above as a three-phase system, but the invention is also applicable to both single-phase and other polyphase ac systems.

In the above description, the embodiment of the invention has been exemplified for control of an electromagnetic device, where a magnetic flux is controlled between cores provided with poles that are provided with pole windings.

It is also possible, by means of embodiments of the invention, to control the magnetic flux in an arbitrary magnetic circuit.

In the event that the device is intended to operate at a different temperature, for example for superconducting applications, it is possible to choose a suitable material for the matrix elements, inter alia based on data in the diagram Any range or device value given herein may be extended or altered without losing the effect sought, as will be apparent to the skilled person for an understanding of the teachings herein.

Disclosures in Swedish patent application No. 0502169-6 of Sep. 29, 2005 and Swedish patent applications No. 0502715-6 and 0502716-4 of Nov. 29, 2005, from which applications this application claims priority, are incorporated herein by reference.

The invention claimed is:

1. An electromagnetic device for controlling a magnetic flux in a polyphase AC system, comprising:
  magnetically connectable cores comprising poles in the polyphase AC system,
  a volume arranged between the cores, wherein the volume comprises a controllable magnetic flux region in the polyphase AC system, and wherein the magnetic flux region comprises a magnetic material that exhibits a relative permeability that may be varied by influencing the temperature of the material, wherein the volume is divided into a matrix, and a temperature control operative to control a temperature of each matrix element for control of the direction of the magnetic flux in the polyphase AC system through the volume.

2. The device according to claim 1, wherein the poles are arranged opposite each other, wherein the poles are fixedly arranged in relation to each other, and wherein the volume is arranged between opposed poles.

3. The device according to claim 1, wherein the temperature control is operative to control a temperature of each matrix element for control of the magnetic flux through the volume additionally with respect to magnitude.

4. The device according to claim 1, wherein the magnetic material comprises a material having a Curie point that lies within a temperature operating range of the device and exhibits paramagnetic properties within said temperature range.

5. The device according to claim 1, wherein the magnetic flux region comprises gadolinium.

6. The device according to claim 5, wherein the magnetic flux region comprising gadolinium is doped with a substance that influences a symmetry of a crystal lattice and/or doped with a substance that influences a magnetic phase transition temperature of the material.

7. The device according to claim 6, wherein the dopant comprises at least one substance belonging to the group of rare-earth elements.

8. The device according to claim 3, wherein the temperature control is adapted to vary the temperature of the matrix elements between 20° C. and 150° C.

9. The device according to claim 1, wherein each pole in the cores comprises pole windings.

10. The device according to claim 7, wherein the rare-earth elements are selected from the group consisting of La, Ce, Pr, Nd, Pm, Sm, Eu, Tb, Dy, Ho, Er, Tm, Yb, Lu.

11. The device according to claim 8, wherein the temperature control is adapted to vary the temperature of the matrix elements between 30° C. and 70° C.

12. The device according to claim 1, wherein the direction of the flux is controlled such that the flux is not directed between opposite poles.

13. A method of controlling a magnetic flux in a polyphase AC system utilizing an electromagnetic device comprising magnetically connectable cores comprising poles, the method comprising:

varying a temperature of a magnetic material in a magnetic flux region of a volume arranged between the cores in the polyphase AC system, wherein the magnetic material exhibits a relative permeability that is highly temperature dependent, and controlling a direction of magnetic flux in the polyphase AC system through the volume by individually varying the temperature in different regions of the volume.

14. The method according to claim 13, wherein the temperature of the magnetic material is varied between 20° C. and 150° C.

15. The method according to claim 14, wherein the control takes place without any relative mechanical movement between the magnetically coupled cores.

16. The method according to claim 14, wherein the temperature of the magnetic material is varied between 30° C. and 70° C.

17. The method according to claim 13, wherein the direction of the flux is controlled such that the flux is not directed between opposite poles.

* * * * *